(12) United States Patent
Readshaw et al.

(10) Patent No.: US 8,555,351 B2
(45) Date of Patent: Oct. 8, 2013

(54) TRUSTED DATABASE AUTHENTICATION THROUGH AN UNTRUSTED INTERMEDIARY

(75) Inventors: Neil I. Readshaw, Parkwood (AU); Ivan M. Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1359 days.

(21) Appl. No.: 12/240,102

(22) Filed: Sep. 29, 2008

(65) Prior Publication Data

US 2010/0083359 A1 Apr. 1, 2010

(51) Int. Cl.
*H04L 9/32* (2006.01)
*G06F 15/16* (2006.01)

(52) U.S. Cl.
USPC .................................................. 726/5; 726/4

(58) Field of Classification Search
None
See application file for complete search history.

(56) References Cited

U.S. PATENT DOCUMENTS

| | | | |
|---|---|---|---|
| 7,100,200 B2 * | 8/2006 | Pope et al. ................. | 726/10 |
| 7,219,154 B2 * | 5/2007 | Blakley et al. ............. | 709/229 |
| 7,325,128 B2 * | 1/2008 | Wood et al. ............... | 713/155 |
| 7,380,280 B2 * | 5/2008 | de Jong .................... | 726/27 |
| 7,421,730 B2 * | 9/2008 | Walther et al. ............ | 726/2 |
| 7,562,382 B2 * | 7/2009 | Hinton et al. .............. | 726/2 |
| 7,698,375 B2 * | 4/2010 | Hinton et al. .............. | 709/217 |
| 8,042,162 B2 * | 10/2011 | Blakley et al. ............. | 726/8 |
| 8,181,225 B2 * | 5/2012 | Hinton et al. .............. | 726/2 |
| 2007/0130473 A1 * | 6/2007 | Mazotas .................... | 713/183 |
| 2010/0083287 A1 * | 4/2010 | Maximilien et al. ...... | 719/328 |
| 2010/0269149 A1 * | 10/2010 | Lee et al. .................. | 726/1 |
| 2011/0191786 A1 * | 8/2011 | Ma et al. ................... | 719/320 |
| 2012/0131217 A1 * | 5/2012 | Delorme et al. ........... | 709/230 |
| 2013/0019002 A1 * | 1/2013 | Heileman et al. .......... | 709/223 |

OTHER PUBLICATIONS

Google Account Authentication—Authentication for Web Applications, http://code.google.com/apis/accounts/AuthForWebApps.html, printed Jan. 18, 2008.
ITS Central Authentication Service (version 1.0), http://www.yale.edu/tp/auth/cas10.html, printed Jan. 18, 2008.

* cited by examiner

*Primary Examiner* — Christopher Revak
(74) *Attorney, Agent, or Firm* — Terrile, Cannatti, Chambers & Holland, LLP; Stephen A. Terrile

(57) ABSTRACT

A method, system and computer-usable medium are disclosed for validating user credentials submitted to a data source by an untrusted intermediary. An untrusted intermediary attempts to access a data source on behalf of a user. The untrusted intermediary challenges the user to provide credentials of the type and format required to access the data provided by the data source. The user's trust client connects to an authentication service and identification credentials of the required type and format are generated. The identification credentials are conveyed to the user's trust client, which then provides them to the user's client, which in turn conveys them to the untrusted intermediary. The untrusted intermediary then presents the identification credentials to an authentication plug-in of the data source. The authentication plug-in validates the authenticity of the provided credentials with their associated authentication service. Once the credentials are successfully validated, the requested data is provided to the user's client by the untrusted intermediary.

14 Claims, 8 Drawing Sheets

US 8,555,351 B2

TRUSTED DATABASE AUTHENTICATION THROUGH AN UNTRUSTED INTERMEDIARY

BACKGROUND OF THE INVENTION

1. Field of the Invention

Embodiments of the disclosure relate in general to the field of computers and similar technologies, and in particular to software utilized in this field. Still more particularly, it relates to the validation of user credentials submitted to a data source by an untrusted intermediary.

2. Description of the Related Art

The way in which Web-based information is aggregated, assembled, and presented continues to evolve. In the early days of the Internet, content was treated as static elements that were assembled, typically by using hypertext markup language (html) code, to create Web pages. Later, technologies such as JavaServer Pages and Active Server Pages, were developed to allow software developers to dynamically generate HTML, extensible markup language (XML), or other types of documents in response to a Web client request. Today, content that exists in different formats can be retrieved from multiple sources on the Web and be combined into a mashup to create entirely new and innovative services. Further, through the use of AJAX and other Web applications informally known as Web 2.0, individual content elements within a Web page can be updated in near-real-time without refreshing the entire Web page.

However, current methods of creating mashups can introduce security concerns. As one example, Web browsers typically incorporate a same-origin policy as a security feature that is used to keep malicious code hosted on a Web site within one domain from requesting data, such as stored credentials, from a site on another domain. As a result, the same-origin policy forces Web applications used in mashups to either sacrifice security or functionality. Another security issue associated with mashups is the submission of user credentials for authentication and authorization. A mashup, acting as an intermediary for a user, may not be able to send user credentials to a data source with its requests. This may be due to the user and the data source not fully trusting the mashup as an intermediary, or the mashup not having the ability to supply the user's credentials to the data source in a compatible format. As one example of a data source, databases are not well equipped today to perform this validation/transformation step. Current solutions typically employ trusted intermediaries to store database authentication credentials and supply them to the database on behalf of the user. Storing user credentials with an untrusted mashup intermediary makes them subject to compromise, and as a result, the authenticity of the user's identity likewise becomes untrusted.

One potential approach to addressing this issue is to have the intermediary repeatedly prompt the user for secrets to authenticate their identity, which is inconvenient for the user, and also exposes the secrets to compromise by the intermediary if it is untrusted. Another known approach is the Google Account Authentication Proxy for Web Applications, which can accept identity tokens generated by a stand-alone authentication server to authenticate a user. However, while it will accept an identity token submitted by an intermediary on behalf of a user, all submitted credentials must be of the same type and format. Furthermore, the back-end service for validating the submitted credentials must reside in the same administration domain as the data source. Yet another known approach is the Yale information Technology Services (ITS) Central Authentication Service (CAS). It is similar in nature to the Google service described above, with the addition of single sign-on. In view of the foregoing, there is a need for preserving the broad creative freedom that mashup intermediaries offer while making them safer to use. This need extends beyond the user authentication required for a mashup intermediary to access a subscription-based public data source to include trustworthy access to secure corporate data sources, such as databases. In particular, there is a need to accept the submission of a variety of security token formats from a mashup intermediary and not require that the back-end service providing the user credentials be in the same administration domain as the data source.

BRIEF SUMMARY OF THE INVENTION

The present invention includes, but is not limited to, a method, system and computer-usable medium for validating user credentials submitted to a data source by an untrusted intermediary. In various embodiments, a user's client accesses an untrusted intermediary for the provision of data from a data source. In one embodiment, the untrusted intermediary is a mashup. As used herein, a mashup is generally defined as the combining of content in various formats and from multiple sources for presentation as a Web page. In these and other embodiments, the untrusted intermediary attempts to access the data source on behalf of the user. In one embodiment, the data source is a database. In various embodiments, user credentials are required to access the data provided by the data source. When they are required, the untrusted intermediary challenges the user to provide credentials of the required type and format. The user's trust client then connects to an authentication service and is authenticated. In one embodiment, the authentication service is a security token service (STS) operable to generate security tokens implemented with the WS-Trust protocol. Once the user is authenticated, the user's trust client requests identification credentials of the required type and format from the STS.

In one embodiment, the STS generates identification credentials of the required type and format. In another embodiment, the STS is unable to provide identification credentials of the required type and format, so identification credentials of an alternate type and format are generated. Once the identification credentials are generated, they are provided to the user's trust client, which in turn provides the identification credentials to the user's client, which then conveys the identification credentials to the untrusted intermediary. In turn, the untrusted intermediary presents the user's identification credentials to an authentication plug-in of the data source. In one embodiment, if the provided identification credentials are not of the required type and format, they are rejected by the authentication plug-in. In another embodiment, the authentication plug-in transforms identification credentials that are not of the required format and type into the format and type required by the data source.

In one embodiment, the authentication plug-in processes the provided identification credentials determine their issuing STS, which is then used to validate the authenticity of the credentials. In one embodiment, the STS is in a different management domain than the authentication plug-in and the data source. In another embodiment, the untrusted intermediary presents user credentials of the required format and type directly to the data source. The data source then validates the provided user credentials with a local authentication service. If the provided user identification credentials are successfully validated, the untrusted intermediary requests the desired data from the data source, which is then provided. In turn, the requested data is presented to the user's client by the untrusted intermediary. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
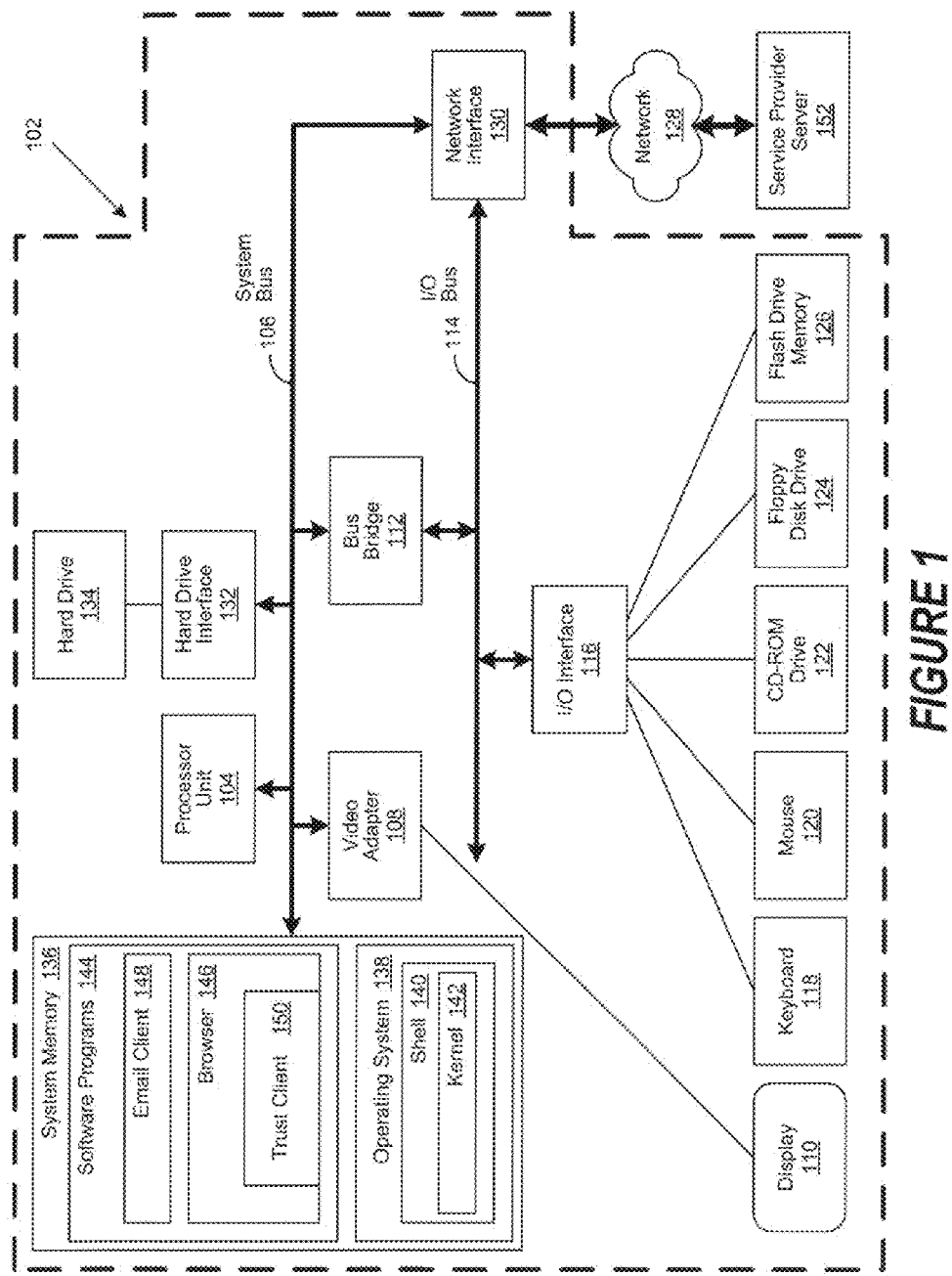
FIG. 1 depicts an exemplary client computer in which the present invention may be implemented.

A method, system and computer-usable medium are disclosed for validating user credentials submitted to a data source by an untrusted intermediary. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a trust client 150. The trust client 150 includes code for implementing the processes described in FIGS. 2 through 5 described hereinbelow. In one embodiment, client computer 102 is able to download the trust client 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
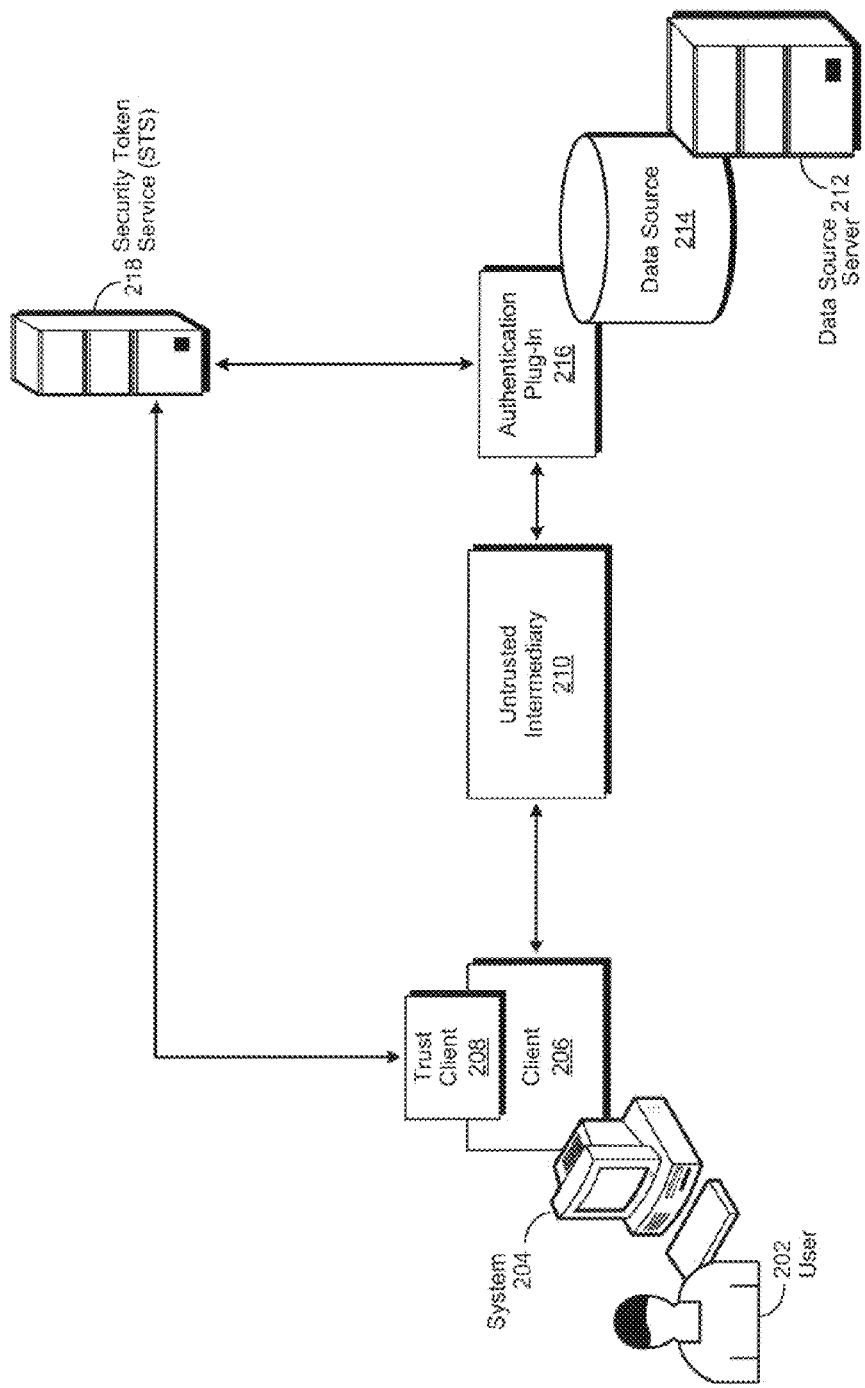
FIG. 2 shows the validation of user credentials submitted to a data source by an intermediary with the security token service that issued the credentials.

FIG. 2 shows the validation of user credentials submitted to a data source on behalf of a user by an intermediary with the security token service that issued the credentials. In various embodiments of the invention, a client 206 running on a system 204 of a user 202 accesses an untrusted intermediary 210 for the provision of data from a data source 214 residing on a data source server 212. In one embodiment, the untrusted intermediary is a mashup. As used herein, a mashup is generally defined as the combining of content in various formats and from multiple sources for presentation as a Web page. In various embodiments, the content source may be static, such as a block of text or a graphic, or dynamic, such as an application or service that generates content in near-real-time. As an example, a Web service may provide a commodities market feed, which is displayed as one element of a mashup, while another Web service may provide a weather forecast map, which is likewise displayed as another element of the mashup.

In these and other embodiments, the untrusted intermediary 210 attempts to access the data source 214 on behalf of the user 202. In one embodiment, the data source 214 is a database. In various embodiments, user credentials are required to access the data provided by the data source 214. When they are required, the untrusted intermediary 210 determines the type and format of user credentials required by the data source 214. Once determined, the intermediary challenges the user 202 to provide credentials of the type and format required by the data source 214. The user's trust client 208 (e.g. Eclipse Project Higgins, Microsoft Cardspace, etc.) then connects to an authentication service and is authenticated. In one embodiment, the authentication service is a security token service (STS) 218 operable to generate security tokens implemented with the WS-Trust protocol familiar to those of skill in the art. Once the user is authenticated, the user's trust client 208 requests identification credentials of the required type and format from the STS 218.

In one embodiment, the STS 218 can provide identification credentials of the required type and format and they are so generated. In another embodiment, the STS 218 is not able to provide identification credentials of the required type and format, and identification credentials of an alternate type and format are generated. Once the identification credentials are generated, they are provided to the user's trust client 208, which in turn provides the identification credentials to the user's client 206.

The user's client 206 then conveys the identification credentials to the untrusted intermediary 210. The untrusted intermediary 210 then presents the user's identification credentials to an authentication plug-in 216 of the data source 214. A determination is then made by the authentication plug-in 216 whether the provided identification credentials are of the type and format required by the data source 214. In one embodiment, if the provided identification credentials are not of the required type and format, they are rejected by the authentication plug-in 216. In another embodiment, the authentication plug-in 216 transforms provided identification credentials that are not of the required format and type into the format and type required by the data source 214.

The authentication plug-in 216 then processes the provided identification credentials determine their issuing STS 218. Once determined, the authentication plug-in 216 validates the provided identification credentials with their issuing STS 218. In one embodiment, the STS 218 is in a different management domain than the authentication plug-in 216 and the data source 214 if the provided user identification credentials are successfully validated, the untrusted intermediary 210 requests the desired data from the data source 214, followed by the provision of the requested data to the untrusted intermediary 210. The requested data is then presented to the user's client 206 by the untrusted intermediary 210.

Figure 3A:
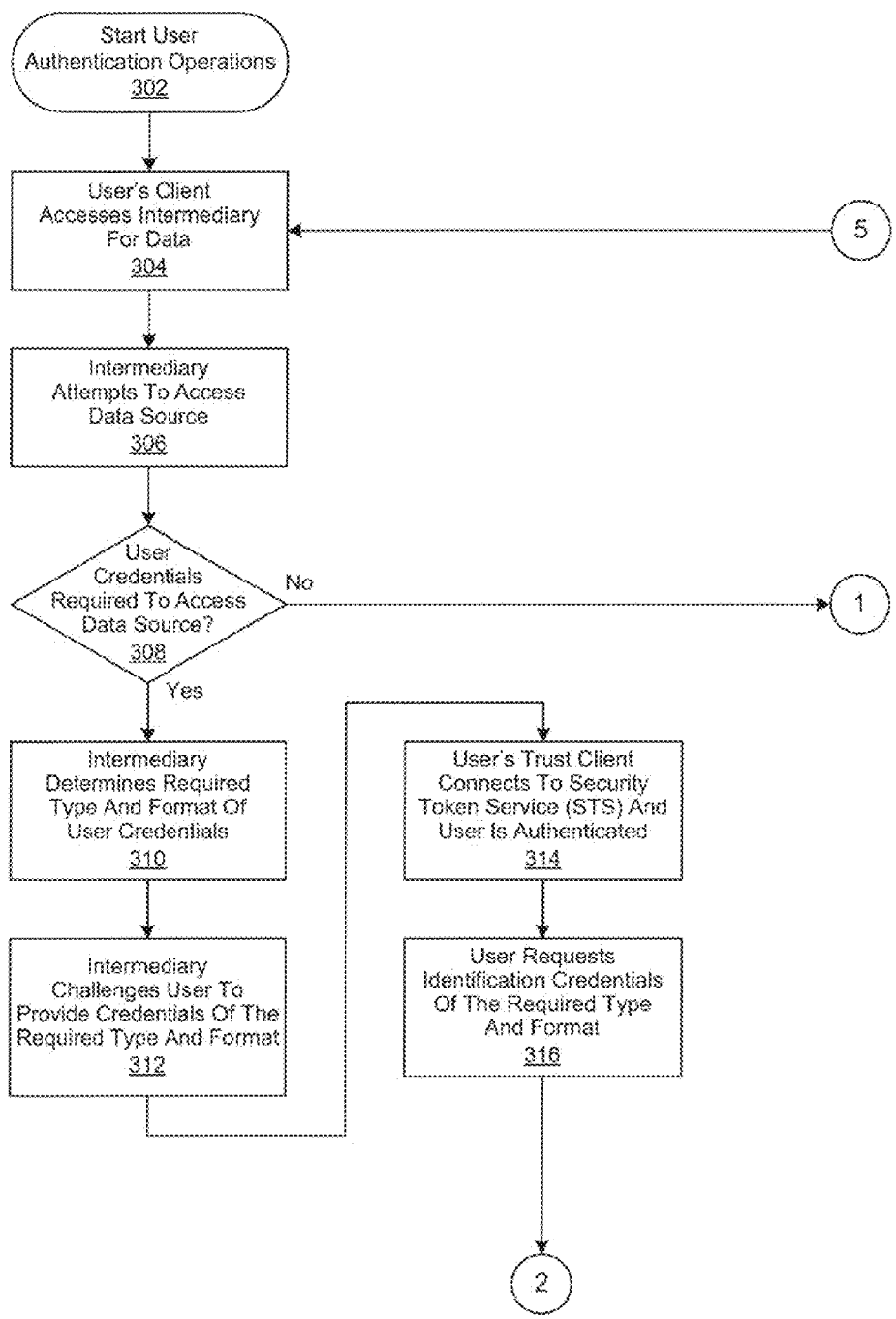
FIGS. 3a-c are a flowchart for validating user credentials submitted to a data source by an intermediary with the security token service that issued the credentials.
Figure 3B:
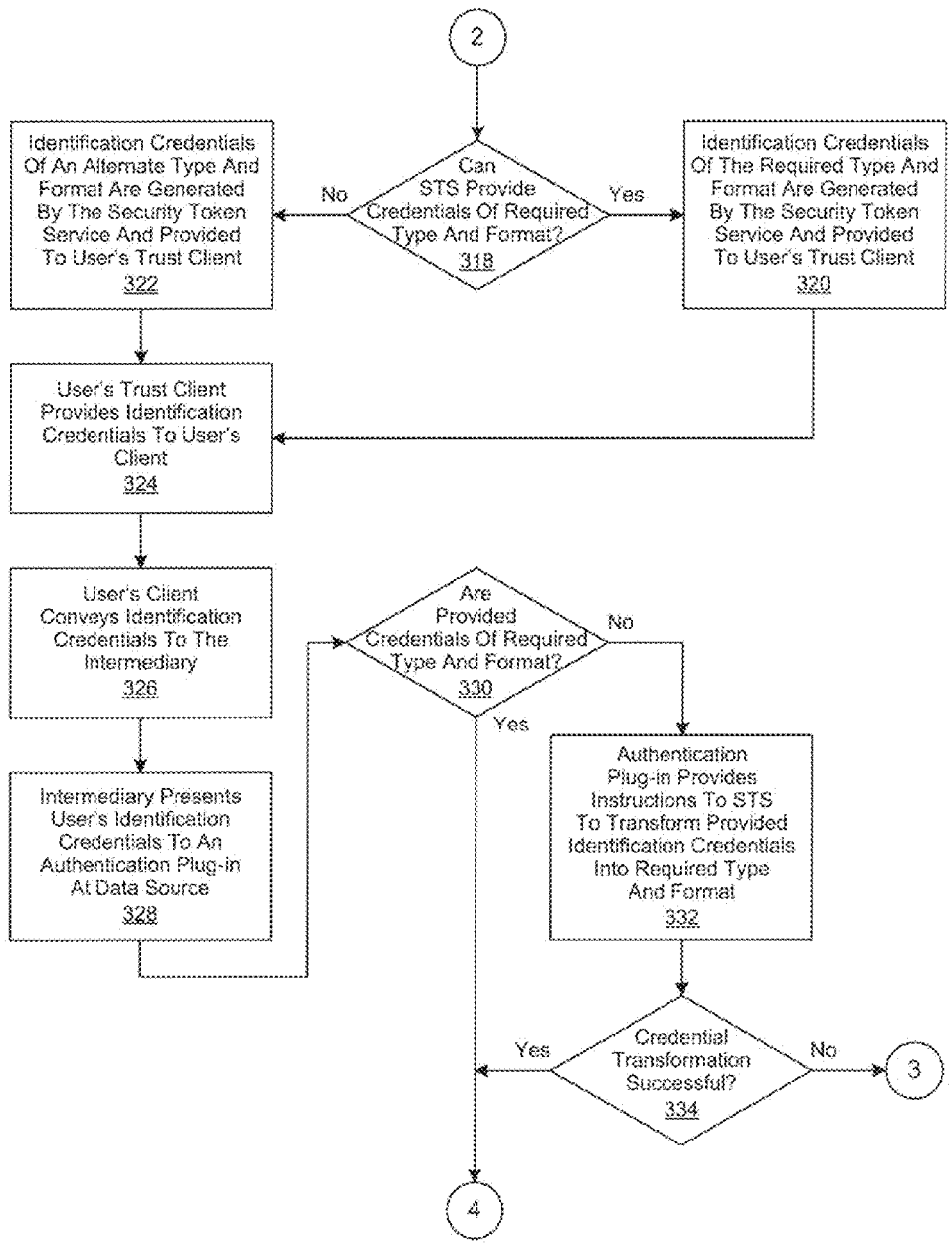
Figure 3C:
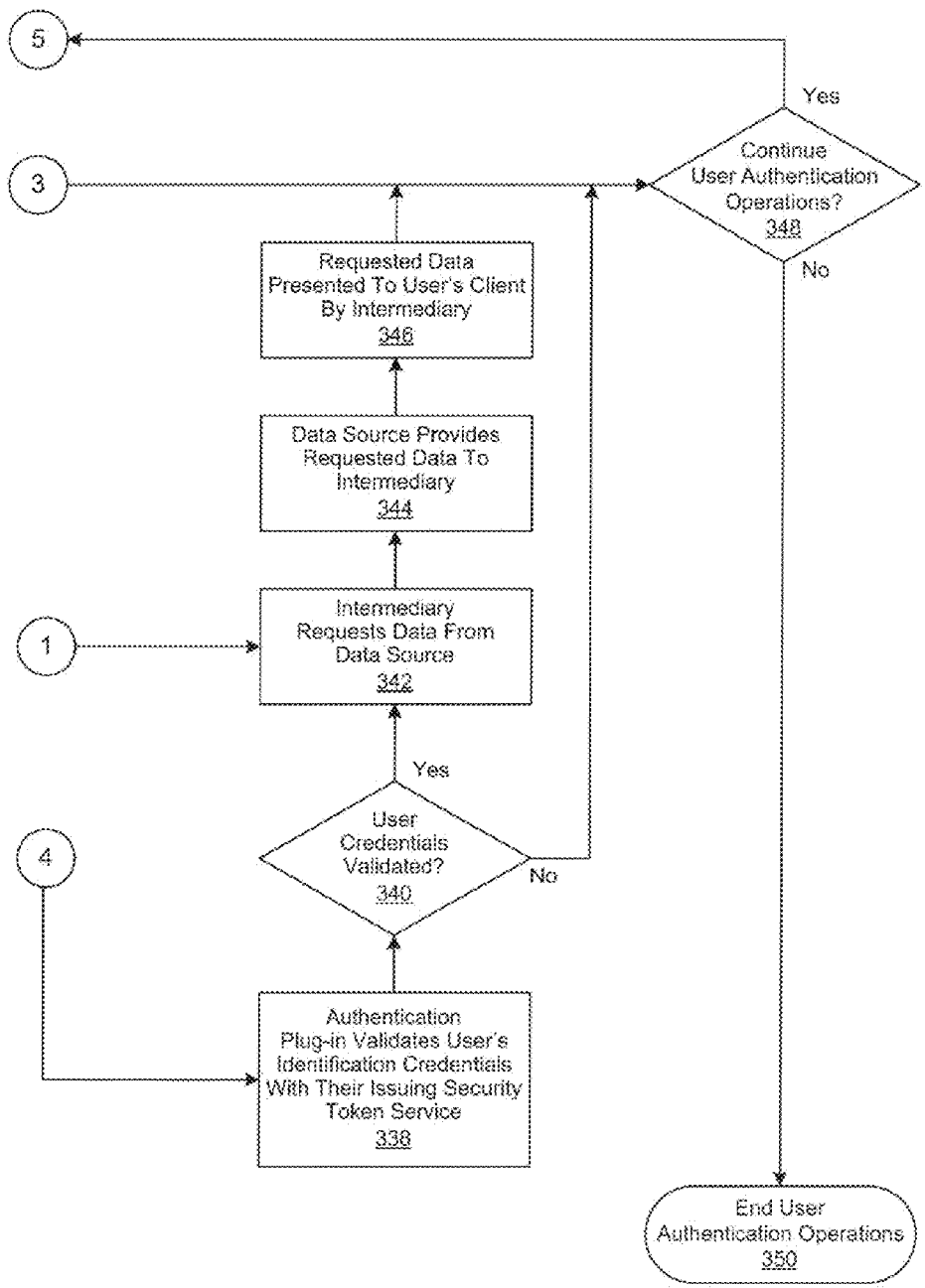

FIGS. 3a-c are a flowchart for validating user credentials submitted to a data source on behalf of a user by an intermediary with the security token service that issued the credentials. In an embodiment of the invention, user authentication operations are begun in step 302, followed by the user's client accessing an intermediary for the provision of data from a data source in step 304. In one embodiment, the intermediary is a mashup. As used herein, a mashup is generally defined as the combining of content in various formats and from multiple sources for presentation as a Web page. In various embodiments, the content source may be static, such as a a block of text or a graphic, or dynamic, such as an application or service that generates content in near-real-time. As an example, a Web service may provide a commodities market feed, which is displayed as one element of a mashup, while another Web service may provide a weather forecast map, which is likewise displayed as another element of the mashup.

In step 306, the intermediary attempts to access the data source on behalf of the user. In one embodiment, the data source is a database. A determination is then made in step 308 whether user credentials are required to access the data provided by the data source. If not, then the intermediary requests the desired data from the data source in step 342, followed by the provision of the requested data to the intermediary in step 344. The requested data is then presented to the user's client by the intermediary in step 346. In one embodiment, the intermediary is a mashup and the requested data is provided as one element of the mashup: A determination is then made in step 348 whether to continue user authentication operations. If so, then the process continues, proceeding with step 304. Otherwise, user authentication operations are ended in step 350.

However, if it is determined in step 308 that the user credentials are required to access the data source, then the intermediary determines the type and format of user credentials required by the data source in step 310. Once determined, the intermediary challenges the user in step 312 to provide credentials of the type and format required by the data source. In step 314, the user's trust client (e.g., Higgins, InfoCard, etc.) connects to an authentication service and is authenticated. In one embodiment, the authentication service is a security token service operable to generate security tokens familiar to those of skill in the art. Once the user is authenticated, the user's trust client requests identification credentials of the required type and format from the authentication service in step 316. A determination is then made in step 318 whether the authentication service can provide identification credentials of the required type and format. If so, then identification credentials of the required type and format are generated in step 320. Otherwise, identification credentials of an alternate type and format are generated in step 322. Once the identification credentials are generated in step 320 or 322, they are provided in step 324 to the user's trust client, which in turn provides the identification credentials to the user's client.

The user's client then conveys the identification credentials to the intermediary in step 326. The intermediary then presents the user's identification credentials to an authentication plug-in of the data source in step 328. A determination is then made by the authentication plug-in in step 330 whether the provided identification credentials are of the required type and format. If not, then the authentication plug-in provides instructions to the STS to transform the provided identification credentials into the format and type required by the data source in step 332. In one embodiment, the STS performs validation operations on the provided credentials as part of the transformation process. A determination is then made in step 334 whether the transformation of the provided identification credentials was successful. If not, then a determination is made in step 348 whether to continue user authentication operations. If so, then the process continues, proceeding with step 304. Otherwise, user authentication operations are ended in step 350.

However, if it is determined in step 330 that the provided identification credentials are of the required type and format, then the authentication plug-in validates the provided identification credentials with their issuing authentication service in step 338. In one embodiment, validation operations are performed on the provided credentials by the STS as part of the transformation process in step 332. A determination is then made in step 340 whether the user credentials were validated. If not, then a determination is made in step 348 whether to continue user authentication operations. If so, then the process continues, proceeding with step 304. Otherwise, user authentication operations are ended in step 350. Otherwise, the intermediary requests the desired data from the data source in step 342, followed by the provision of the requested data to the intermediary in step 344. The requested data is then presented to the user's client by the intermediary in step 346. A determination is then made in step 348 whether to continue user authentication operations. If so, then the process continues, proceeding with step 304. Otherwise, user authentication operations are ended in step 350.

Figure 4:
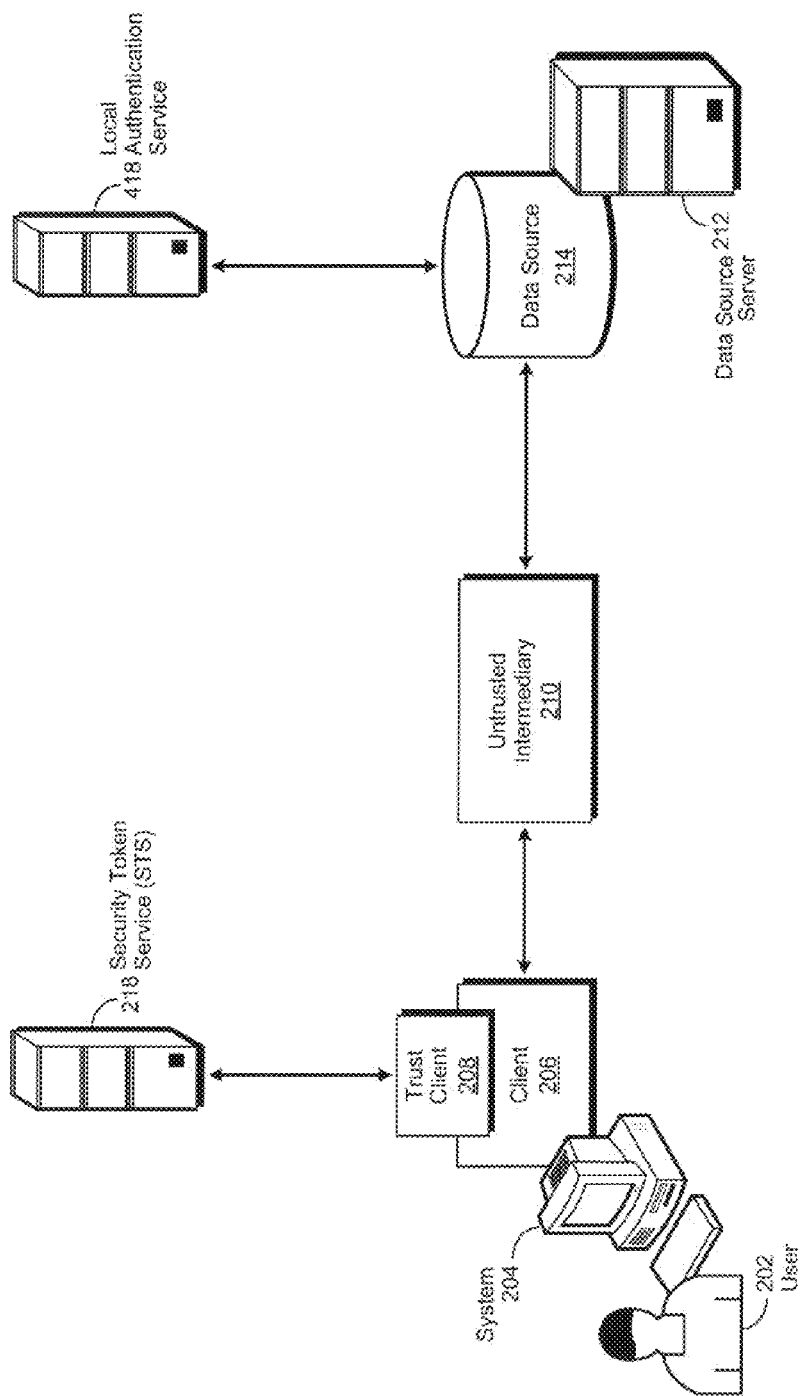
FIG. 4 shows the validation of user credentials submitted to a data source by an intermediary with a local authentication service.

FIG. 4 shows the validation of user credentials submitted to a data source on behalf of a user by an intermediary with a local authentication service. In various embodiments of the invention, a client 206 running on a system 204 of a user 202 accesses an untrusted intermediary 210 for the provision of data from a data source 214 residing on a data source server 212. In one embodiment, the untrusted intermediary is a mashup. In these and other embodiments, the untrusted intermediary 210 attempts to access the data source 214 on behalf of the user 202. In one embodiment, the data source 214 is a database. In various embodiments, user credentials are required to access the data provided by the data source 214. When they are required, the untrusted intermediary 210 determines the type and format of user credentials required by the data source 214. Once determined, the intermediary challenges the user 202 to provide credentials of the type and format required by the data source 214. The user's trust client 208 (e.g., Higgins, InfoCard, etc.) then connects to an authentication service and is authenticated. In one embodiment, the authentication service is a security token service (STS) 218 operable to generate security tokens familiar to those of skill in the art. Once the user is authenticated, the user's trust client 208 requests identification credentials of the required type and format from the STS 218.

Once the identification credentials of the required type and format are generated, they are provided to the user's trust client 208, which in turn provides the identification credentials to the user's client 206. The user's client 206 then conveys the identification credentials to the untrusted intermediary 210. The untrusted intermediary 210 then presents the user's identification credentials to the data source 214. In one embodiment, if the provided identification credentials are not of the required type and format, they are rejected by the data source 214. The data source 214 then validates the provided identification credentials with a local authentication service 418. If the provided user identification credentials are successfully validated, the untrusted intermediary 210 requests the desired data from the data source 214, followed by the provision of the requested data to the untrusted intermediary 210. The requested data is then presented to the user's client 206 by the untrusted intermediary 210.

Figure 5A:
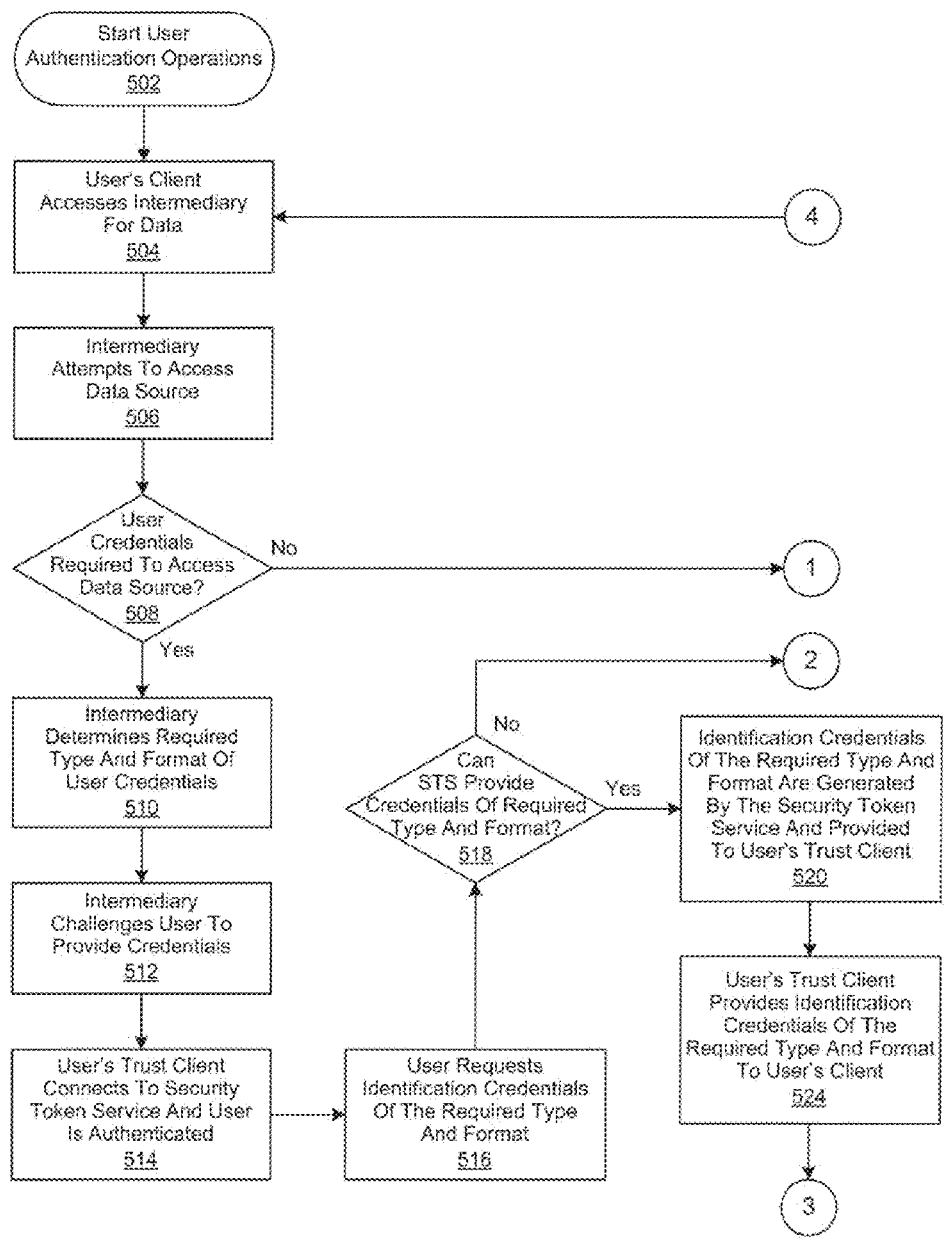
FIGS. 5a-b are a flowchart for validating user credentials submitted to a data source by an intermediary with a local authentication service.
Figure 5B:
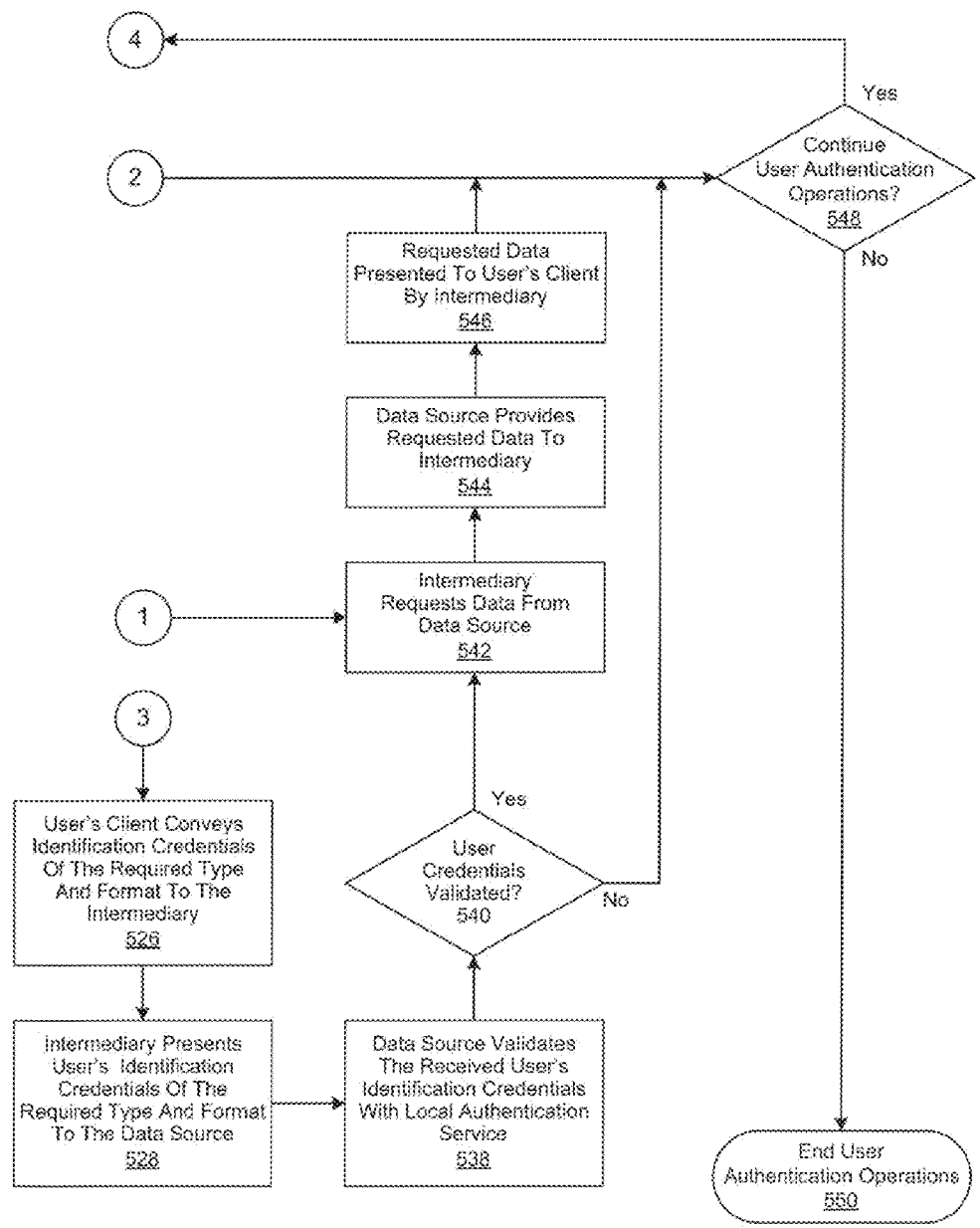

FIGS. 5*a-b* is a flowchart for validating user credentials submitted to a data source by an intermediary with a local authentication service. In an embodiment of the invention, user authentication operations are begun in step 502, followed by the user's client accessing an intermediary for the provision of data from a data source in step 504. In one embodiment, the intermediary is a mashup.

In step 506, the intermediary attempts to access the data source on behalf of the user. In one embodiment, the data source is a database. A determination is then made in step 508 whether user credentials are required to access the data provided by the data source. If not, then the intermediary requests the desired data from the data source in step 542, followed by the provision of the requested data to the intermediary in step 544. The requested data is then presented to the user's client by the intermediary in step 546. In one embodiment, the intermediary is a mashup and the requested data is provided as one element of the mashup. A determination is then made in step 548 whether to continue user authentication operations. If so, then the process continues, proceeding with step 504. Otherwise, user authentication operations are ended in step 550.

However, if it is determined in step 508 that the user credentials are required to access the data source, then the intermediary determines the type and format of user credentials required by the data source in step 510. Once determined, the intermediary challenges the user in step 512 to provide credentials of the type and format required by the data source. In step 514, the user's trust client (e.g., Higgins, InfoCard, etc.) connects to an authentication service and is authenticated. In one embodiment, the authentication service is a security token service operable to generate security tokens familiar to those of skill in the art. Once the user is authenticated, the user's trust client requests identification credentials of the required type and format from the authentication service in step 516. A determination is then made in step 518 whether the authentication service can provide identification credentials of the required type and format. If not, then a determination is made in step 548 whether to continue user authentication operations. If so, then the process continues, proceeding with step 504. Otherwise, user authentication operations are ended in step 550.

However, if it is determined in step 518 that the authentication service can provide identification credentials of the required type and format, then they are generated in step 520 and provided to the user's trust client. Once the identification credentials of the required type and format are generated in step 520, the user's trust client in turn provides the identification credentials to the user's client in step 524. The user's client then conveys the identification credentials to the intermediary in step 526. The intermediary then presents the user's identification credentials of the required type and format to the data source in step 528. The data source then validates the provided user identification credentials to a local authentication service in step 538. In one embodiment, the local authentication service is within the same management domain and the data source. In another embodiment, the authentication service that generated the user identification credentials is in one management domain and the local authentication service is within another management domain.

A determination is then made in step 540 whether the user credentials were validated. If not, then a determination is made in step 548 whether to continue user authentication operations. If so, then the process continues, proceeding with step 504. Otherwise, user authentication operations are ended in step 550. However, if it is determined in step 540 that the provided user identification credentials are validated, the intermediary requests the desired data from the data source in step 542, followed by the provision of the requested data to the intermediary in step 544. The requested data is then presented to the user's client by the intermediary in step 546. A determination is then made in step 548 whether to continue user authentication operations. If so, then the process continues, proceeding with step 504. Otherwise, user authentication operations are ended in step 550.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for authenticating a user to a data source, comprising:

receiving a request to provide information on behalf of a user;

requesting the submission of user authentication credentials in a desired format;

receiving the requested user authentication credentials, the user authentication credentials generated in the desired format by a security token service;

validating the received user authentication credentials with the security token service, the validation performed by a back-end service; and providing the requested information, the providing being based on successfully validating the received user authentication credentials; and wherein the receiving a request to provide information is to an intermediary;

the receiving the requested user authentication credentials is from the intermediary; and, the providing the requested information is to the intermediary; and wherein the intermediary comprises a mashup, the mashup combining content in various formats and from multiple sources for presentation as a Web page.

2. The method of claim 1, wherein the user authentication credentials are provided to the intermediary by the user, the provision in response to a request from the intermediary for the user authentication credentials.

3. The method of claim 1, wherein the user authentication credentials are not received in the desired format and are subsequently transformed to the desired format.

4. The method of claim 1, wherein the back-end service is not in the same administrative domain as the data source.

5. A system comprising:
a processor;
a data bus coupled to the processor; and
a computer-usable medium embodying computer program code, the computer-usable medium being coupled to the data bus, the computer program code operable to authenticate a user to a data source and comprising instructions executable by the processor and configured for:
receiving a request to provide information on behalf of a user;
requesting the submission of user authentication credentials in a desired format;
receiving the requested user authentication credentials, the user authentication credentials generated in the desired format by a security token service;
validating the received user authentication credentials with the security token service, the validation performed by a back-end service; and
providing the requested information, the providing being based on successfully validating the received user authentication credentials; and wherein
the receiving a request to provide information is to an intermediary;
the receiving the requested user authentication credentials is from the intermediary; and,
the providing the requested information is to the intermediary; and wherein
the intermediary comprises a mashup, the mashup combining content in various formats and from multiple sources for presentation as a Web page.

6. The system of claim 5, wherein the user authentication credentials are provided to the intermediary by the user, the provision in response to a request from the intermediary for the user authentication credentials.

7. The system of claim 5, wherein the user authentication credentials are not received in the desired format and are subsequently transformed to the desired format.

8. The system of claim 5, wherein the back-end service is not in the same administrative domain as the data source.

9. A non-transitory computer-usable medium embodying computer program code, the computer program code comprising computer executable instructions configured for:
receiving a request to provide information on behalf of a user;
requesting the submission of user authentication credentials in a desired format;
receiving the requested user authentication credentials, the user authentication credentials generated in the desired format by a security token service;
validating the received user authentication credentials with the security token service, the validation performed by a back-end service; and
providing the requested information, the providing being based on successfully validating the received user authentication credentials; and wherein
the receiving a request to provide information is to an intermediary;
the receiving the requested user authentication credentials is from the intermediary; and,
the providing the requested information is to the intermediary; and wherein
the intermediary comprises a mashup, the mashup combining content in various formats and from multiple sources for presentation as a Web page.

10. The computer usable medium of claim 9, wherein the user authentication credentials are provided to the intermediary by the user, the provision in response to a request from the intermediary for the user authentication credentials.

11. The computer usable medium of claim 9, wherein the user authentication credentials are not received in the desired format and are subsequently transformed to the desired format.

12. The computer usable medium of claim 9, wherein the back-end service is not in the same administrative domain as the data source.

13. The computer usable medium of claim 9, wherein the computer executable instructions are deployable to a client computer from a server at a remote location.

14. The computer usable medium of claim 9, wherein the computer executable instructions are provided by a service provider to a customer on an on-demand basis.

* * * * *